United States Patent [19]
Dickman

[11] Patent Number: 5,357,764
[45] Date of Patent: Oct. 25, 1994

[54] CONDENSATE EVAPORATOR

[75] Inventor: Daniel H. Dickman, Racine, Wis.

[73] Assignee: Dickman & Dickman, Inc., Racine, Wis.

[21] Appl. No.: 967,035

[22] Filed: Oct. 27, 1992

[51] Int. Cl.⁵ .............................. F25D 7/00; F25B 9/00
[52] U.S. Cl. ............................................. 62/93; 62/121
[58] Field of Search ................ 62/93, 92, 304, 272, 62/121

[56] References Cited
U.S. PATENT DOCUMENTS

| | | | |
|---|---|---|---|
| 1,810,750 | 6/1931 | Braunstein et al. | 62/93 |
| 1,982,622 | 12/1934 | Anger | 62/93 |
| 2,077,315 | 4/1937 | Ewing et al. | 62/93 |
| 3,226,948 | 1/1966 | Alderson et al. | 62/93 |
| 3,587,243 | 6/1971 | Keller et al. | 62/93 |
| 3,765,168 | 10/1973 | Wagle | 60/39.02 |
| 3,792,572 | 2/1974 | Turbin | 55/269 |
| 4,493,195 | 1/1985 | Zalesak et al. | 62/402 |
| 4,934,451 | 6/1990 | Colvin | 165/2 |
| 4,977,753 | 12/1990 | Malsotsenko et al. | 62/121 |
| 5,129,446 | 7/1992 | Beamer | 165/41 |

Primary Examiner—Henry A. Bennet
Assistant Examiner—William C. Doerrler
Attorney, Agent, or Firm—Joseph T. Kivlin, Jr.

[57] ABSTRACT

A system for improving the efficiency of the cooling system for a compressor for air or other compressible gas, involving the use of the condensate produced by the compression, which is presented for evaporation at the point of entry of the stream of coolant gas into heat exchangers, whereby the heat required for evaporation of the condensate is taken from such coolant gas to precool the same before it enters the heat exchanger.

5 Claims, 1 Drawing Sheet

5,357,764

CONDENSATE EVAPORATOR

FIELD OF THE INVENTION

The present invention relates to a system for improving the efficiency of conventional compressors for air or other gases, by reusing the condensate produced by the cooling of the compressed gas.

BACKGROUND

In a standard air compressor, the compressed air is completely saturated with water vapor as it leaves the final stage of compression. Air thus compressed must be cooled to be of further use, for example in pneumatic tools. The cooling step always produces a condensate when the saturated moist air is passed through an after-cooling device or coil, with the condensate forming on the inside surface of such device current practice is to discard such condensate.

Cooling and drying compressed air is a major expense, both in the initial investment in equipment, and in the continuing costs of energy to operate it. Some systems employ an air-cooled aftercooler, like a large radiator, with compressed gas inside, and outside air passing between the coils. Some use a refrigerated dryer, a chiller system having a refrigeration circuit, which cools and then reheats compressed air to reduce its moisture content. Other systems may use a combination of both an aftercooler and a refrigerated dryer. Sometimes even the compressor itself is cooled, by passing air over cooling fins mounted on it, or by an air cooled water system which functions like the radiator on an automobile engine.

In addition to greatly reducing the cost of operating such equipment, the present invention provides a significant environmental benefit. The condensate may be entirely consumed in the operation of the system, eliminating the need to treat it upon discarding. Moreover, there may be no need to use water from outside the installation for cooling, since the condensate alone may suffice for that purpose.

SUMMARY OF THE PRESENT INVENTION

In one embodiment, the system of the present invention utilizes the condensate resulting from the compression of air to further enhance the cooling efficiency of the aftercooler, dryer, or any other air cooled radiator device. This is accomplished by pre-cooling the air stream used by the aftercooler, dryer, or other equipment. It does so by subjecting such air stream to the evaporation of the condensate.

The condensate is first separated from the compressed air at the separator. This water is "distilled water", and doesn't have the normal contaminants or dissolved solids and minerals contained in water from natural sources. Because the condensate is under pressure from the compressor itself, no pumps are required to transport the condensate to the evaporator filter or wet deck surfaces in the cooling air stream. This condensate, by evaporation in the stream of cooling air of air-cooled equipment, pre-cools the air stream so the air-cooled equipment has a lower "dry-bulb" air temperature. The wet bulb temperature of this cooling air is the principal variable in determining the maximum increase in efficiency gained. It is possible, with this system, to obtain cooling performances from equipment at 100° F. dry bulb temperatures that would normally only be obtained at 65° F. dry bulb.

A second source of compressed air condensate is from a refrigerated dryer. This source uses a chiller to first overcool the compressed air, causing water vapor to condense, and then re-heats the compressed air to obtain a lower dew point. By using the compressed air condensate to pre-cool the air cooled chiller evaporator coil, higher efficiencies can be obtained by the chiller.

BRIEF DESCRIPTION OF THE DRAWING

The single figure of the drawing is a schematic view of the invention.

DETAILED DESCRIPTION

Figure 1:
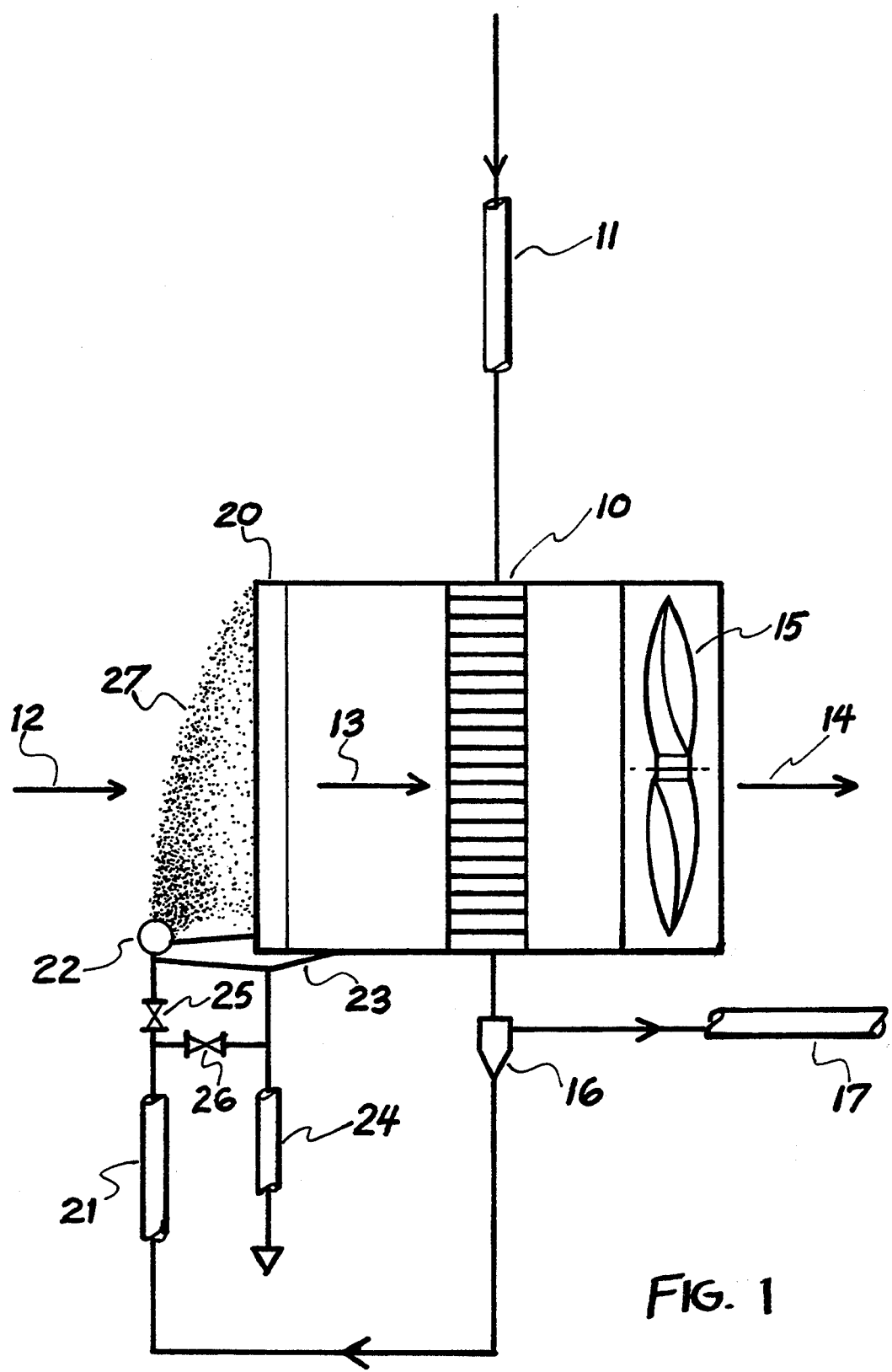

The structure of this invention, as shown in the schematic, includes a coil 10 which may be part of an air-cooled aftercooler or an air-cooled chiller-condenser. A stream of hot saturated compressed gas is passed inside this coil from conduit 11, where it is cooled by a stream of uncompressed gas passing in the direction shown at arrows 12, 13, & 14, being propelled by fan 15. During the cooling process, the compressed gas gives up much of its moisture which is trapped at the separator-collector 16, with the cooled compressed gas being carried away through conduit 17. The condensate is directed from the separator-collector to an evaporator 20 through conduit 21 and a suitable spray device 22. Condensate is sprayed at 27 onto a gas permeable element in evaporator or wet deck 20, through which the uncompressed gas, indicated by arrows at 12 and 13, is passed. The membrane or porous element of evaporator 20 allows the uncompressed gas to be drawn therethrough by the fan 15. As the condensate flows down over the porous element, some or all of it will evaporate, depending upon atmospheric conditions, taking heat from the uncompressed gas to accomplish such evaporation. The excess condensate, if any, flows down to collector tray 23 from which it is discharged by conduit 24. Valves 25 and 26 are used to control the flow of the condensate so that an appropriate volume is sprayed on to the evaporator membrane 20. In practice, however, if evaporator 20 is sufficiently large, there will be little or no excess condensate.

From the foregoing, it will be obvious to one skilled in the art that the same principles can be applied to other systems, wherein a gas other than air is employed, or even where condensates other than water are used. The present disclosure is illustrative only and should not be construed to limit the scope of the present invention.

Having thus described my invention, what I claim is:

1. In a compressed gas cooling system, wherein vapor-laden compressed gas is cooled by a stream of uncompressed gas and wherein liquid condensed by such cooling is removed from the compressed gas stream, the method of precooling said uncompressed gas which consists of discharging said condensate to an gas permeable element and passing said uncompressed gas past said element.

2. The method of claim 1 wherein the gas is air and the condensate is water.

3. The method of claim 2, wherein the cooling system is an air-cooled aftercooler, and the vapor-laden compressed gas is air.

4. The method of claim 2, wherein the cooling system is an air-cooled chiller-condenser, and the vapor-laden compressed gas is air which is cooled through the chiller-condenser by uncompressed air.

5. A compressed gas cooling system comprising:
   a. a coil for cooling vapor-laden compressed gas, and means for moving such compressed gas therethrough;
   b. means for moving uncompressed gas over the exterior surface of said coil to cool said vapor-laden compressed gas and to condense said vapor;
   c. a gas permeable element in said uncompressed gas stream, located upstream from said cooling coil, for receiving said condensed vapor and for evaporating said condensed vapor by withdrawing heat from said uncompressed gas and thereby cooling the latter; and
   d. means for collecting said condensate and discharging it to said gas permeable element.

* * * * *